(12) United States Patent
Segarra et al.

(10) Patent No.: US 10,146,731 B2
(45) Date of Patent: Dec. 4, 2018

(54) CAN MODULE AND METHOD THEREFOR

(71) Applicant: NXP USA, Inc., Austin, TX (US)

(72) Inventors: Laurent Segarra, Tournefeuille (FR); Philippe Goyhenetche, Fonsorbes (FR); Simon Bertrand, Ramonville Saint Agne (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/654,479

(22) Filed: Jul. 19, 2017

(65) Prior Publication Data

US 2018/0121385 A1 May 3, 2018

(30) Foreign Application Priority Data

Nov. 2, 2016 (EP) .................................... 16306437

(51) Int. Cl.
| | |
|---|---|
| *G06F 13/42* | (2006.01) |
| *H04L 12/40* | (2006.01) |
| *H04B 3/06* | (2006.01) |
| *H04L 12/413* | (2006.01) |
| *H04L 25/02* | (2006.01) |

(52) U.S. Cl.
CPC .......... *G06F 13/4286* (2013.01); *H04B 3/06* (2013.01); *H04L 12/40006* (2013.01); *H04L 12/40013* (2013.01); *H04L 12/4013* (2013.01); *H04L 12/40169* (2013.01); *H04L 12/4135* (2013.01); *H04L 25/0286* (2013.01); *G05B 2219/25032* (2013.01); *H04L 2012/40215* (2013.01)

(58) Field of Classification Search
CPC . G06F 13/4286; H04B 3/06; H04L 12/40006; H04L 12/40013; H04L 12/4013; H04L 12/40169; H04L 12/4135; H04L 25/0286
USPC ........................................................ 710/106
See application file for complete search history.

(56) References Cited

U.S. PATENT DOCUMENTS

| | | | | |
|---|---|---|---|---|
| 4,567,378 A * | 1/1986 | Raver | ...................... | H03K 6/04 326/27 |
| 5,321,320 A * | 6/1994 | Collins | ................ | H03K 19/086 326/126 |
| 5,489,862 A * | 2/1996 | Risinger | .......... | H03K 19/00353 326/83 |
| 5,698,991 A * | 12/1997 | Kamiya | .............. | G06F 13/4072 326/26 |
| 8,779,819 B1 * | 7/2014 | Venditti | ................ | H03K 5/086 327/170 |

(Continued)

FOREIGN PATENT DOCUMENTS

| | | |
|---|---|---|
| DE | 10 2012 202 203 A1 | 8/2012 |
| DE | 10 2013 222 789 A1 | 5/2015 |
| DE | 10 2013 222 790 A1 | 5/2015 |

*Primary Examiner* — Paul R. Myers
(74) *Attorney, Agent, or Firm* — Rajeev Madnawat

(57) ABSTRACT

A CAN module comprising a bit duration compensation component arranged to generate a compensated transmit command signal for controlling the driver component to drive a dominant state on the CAN bus. The compensated transmit command signal comprises dominant bits of a compensated-bit duration $T_{bit\_cp}=T_{bit\_Tx}+tc$, wherein tc comprises a compensation offset derived at least partly from a difference between a transmit-bit duration of a digital transmit command signal and a receive-bit duration of a received data signal.

14 Claims, 7 Drawing Sheets

(56) References Cited

U.S. PATENT DOCUMENTS

| | | | |
|---|---|---|---|
| 9,685,944 B1* | 6/2017 | Seshita | H03K 17/223 |
| 2003/0043822 A1* | 3/2003 | Baba | H04L 5/14 370/400 |
| 2004/0090255 A1* | 5/2004 | Ajit | H03H 11/265 327/170 |
| 2009/0303210 A1* | 12/2009 | Nishimura | G09G 3/3688 345/204 |
| 2010/0201399 A1 | 8/2010 | Metzner et al. | |
| 2016/0254926 A1 | 9/2016 | Walker et al. | |
| 2016/0283435 A1 | 9/2016 | Walker et al. | |

\* cited by examiner

CAN MODULE AND METHOD THEREFOR

CROSS-REFERENCE TO RELATED APPLICATIONS

This application claims the priority under 35 U.S.C. § 119 of European Patent application no. 16306437.1, filed on Nov. 2, 2016, the contents of which are incorporated by reference herein.

FIELD OF THE INVENTION

This invention relates to a controller area network (CAN) module and a method of driving a dominant state on a CAN bus.

BACKGROUND OF THE INVENTION

A Controller Area Network (CAN bus) is a communications standard designed to allow microcontrollers and devices to communicate with each other in applications without a host computer. CAN-FD (flexible data-rate) is an extension of the CAN standard developed to improve the achievable bandwidths of CAN networks.

The bit rate requirements for CAN-FD networks are faster than those of standard CAN network, with the current requirement being 5 Mbps and higher rates planned for the future. In order to achieve the current 5 Mbps data rate, a maximum transmitted bit width (t_bit) of 200 ns is required.

FIG. 1 schematically illustrates the transmission of bits over a CAN bus. The logical state provided to the CAN driver, and which is to be transmitted over the CAN bus is illustrated at 110. The voltage level on the CAN bus channel (e.g. as might be seen on the CAN-H bus line) is illustrated at 120. The logical state output by a CAN receiver in response to the voltage level on the CAN bus channel is illustrated at 130. The voltage level on the CAN bus channel 120 is driven by the CAN driver in response to the logical state 110 to be transmitted. The duration of a particular state on the CAN bus is dependent not only on the logical state 110 provided to the CAN driver, but also on the rates at which the voltage level 120 on the CAN bus channel rises and falls.

The CAN standard (ISO 11898) requires symmetrical durations for bit states such that: $T_{bit\_}Tx \approx T_{bit\_}Bus \approx T_{bit\_}Rx$. However, the physical layer open drain topology of a typical CAN driver means that the rise and fall times of the voltage level on the CAN bus channel 120 can differ significantly, resulting in asymmetrical durations for bit states. Specifically, the rise time of the voltage level on the CAN bus channel 120 is driven by the CAN PHY driver whilst the fall time is driven by passive elements. As a result, the fall time is typically much greater than the rise time. Increasing the rise time on the CAN bus channel would mean reducing the achievable bit rate (contrary to the desire to increase the achievable bit rates of CAN systems) whilst EMC compliancy constraints prohibit reducing the fall time on the CAN bus channel.

SUMMARY OF THE INVENTION

The present invention provides a controller area network module and a method of driving a dominant state on a controller area network bus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Example embodiments will now be described with reference to the accompanying drawings. However, it will be appreciated that the present invention is not limited to the specific embodiments herein described and as illustrated in the accompanying drawings, and as will be apparent to the skilled person various modifications and variations may be made without departing from the inventive concept.

Figure 1:
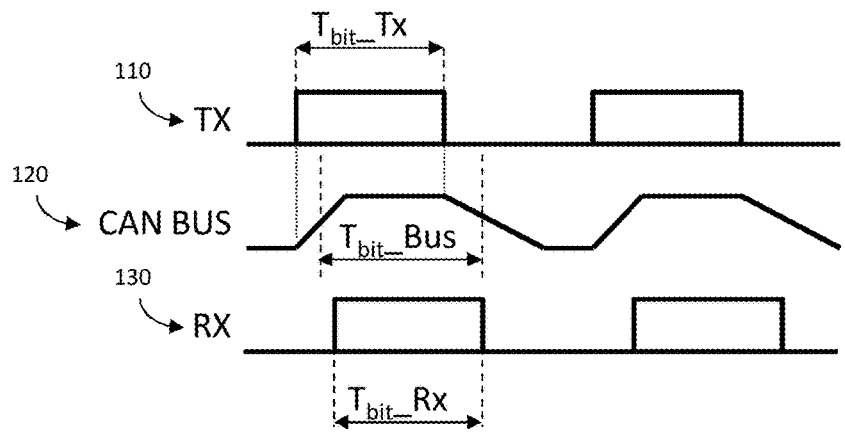
FIG. 1 schematically illustrates the transmission of bits over a CAN bus.
Figure 2:
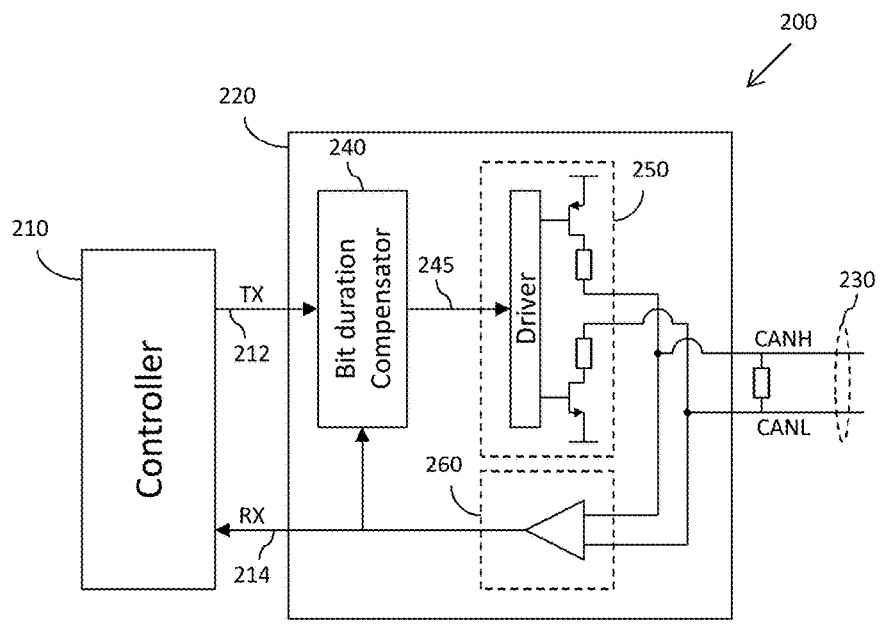
FIG. 2 illustrates a simplified block diagram of a part of a CAN module.

Referring now to FIG. 2, there is illustrated a simplified block diagram of a part of a Controller Area Network (CAN) module 200. A transceiver component 220 of the CAN module 200 comprises a transmit path arranged to receive a digital transmit command signal 212 from a CAN controller 210 of the CAN module 200, and to transmit data received via the digital transmit command signal 212 over a CAN bus 230. The transceiver component 220 further comprises a receive path comprising a receiver component 260 arranged to generate a received data signal 214 corresponding to a voltage signal on the CAN bus 230 and output the received data signal 214 to the CAN controller 210.

The digital transmit command signal 212 is arranged to comprise a first logical state (e.g. a logical '1') and a second logical state (e.g. a logical '0'). The CAN bus 230 is arranged to have a recessive state (e.g. a 0 v state) to which the CAN bus defaults when no signal is being transmitted, and a dominant state (e.g. a 2 v state) driven by a CAN transceiver coupled thereto, such as the transceiver component 220 illustrated in FIG. 2. When the digital transmit command signal 212 comprises its first logical state, the transceiver component 220 is arranged to allow the CAN bus 230 to revert to its recessive state. Conversely, when the digital transmit command signal 212 comprises its second logical state, a driver circuit 250 of the transceiver component 220 is controllable to drive the CAN bus 230 to its dominant state.

Figure 3:
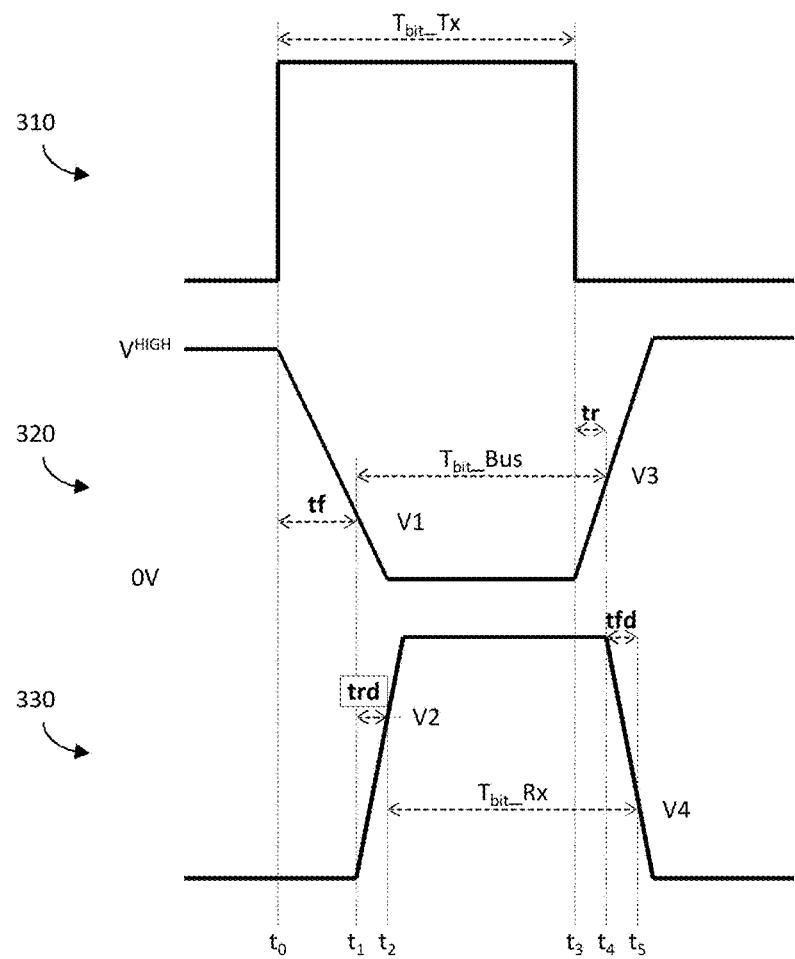
FIG. 3 schematically illustrates a conventional transmission of bits over a CAN bus FIG. 4 schematically illustrates a transmission of bits over a CAN bus according to some example embodiments.

FIG. 3 schematically illustrates a conventional transmission of bits over a CAN bus. A digital transmit command signal provided to the CAN driver, and which is to be transmitted over the CAN bus is illustrated at 310. The voltage level on the CAN bus channel (e.g. as might be seen on the CAN-H bus line) is illustrated at 320. The voltage signal output by a CAN receiver in response to the voltage level on the CAN bus channel is illustrated at 330. In the example illustrated in FIG. 3, the digital transmit command signal 310 initially comprises a first ('0') logical state, in response to which the CAN driver is arranged to drive a dominant ($V^{HIGH}$) state on the CAN bus. In response to the dominant state on the CAN bus, the CAN receiver is arranged to output a first ('0') logical state. At time to, the digital transmit command signal 310 transitions to a second ('1') logical state, in response to which the CAN driver is arranged to allow the CAN bus to revert to its recessive (e.g. 0 V) state. At time $t_1$, the voltage 320 on the CAN bus drops below a threshold voltage level V1, triggering the CAN receiver to transition its output signal from the first ('0') logical state to a second ('1') logical state. At time $t_2$, the output signal from the CAN receiver achieves a threshold voltage level V2 required for signalling a second ('1') logical state within, for example, a CAN controller. At time $t_3$, the digital transmit command signal 310 transitions back to the first ('0') logical state, in response to which the CAN driver is arranged to drive the CAN bus back to its dominant ($V^{HIGH}$) state. At time $t_4$, the voltage 320 on the CAN bus is driven above a threshold voltage V3, triggering the CAN receiver to transition its output signal from the second ('1') logical state to the first ('0') logical state. At time $t_5$, the output signal from the CAN receiver drops to the threshold voltage level V4 required for signalling the first ('0') logical state within, for example a CAN controller.

As illustrated in FIG. 3, the transmit bit duration $T_{bit\_}Tx$ for the logical '1' state within the digital transmit command signal 310 is from time $t_0$ to time $t_3$. The corresponding bus bit duration $T_{bit\_}Bus$ for the recessive bus state is from time $t_1$ to time $t_4$. Notably, $t_0=t_1-tf$ where tf is the fall time for the CAN bus voltage 320 from its dominant ($V^{HIGH}$) state to, in the illustrated example, the threshold voltage level V1, and $t_3=t_4-tr$ where tr is the rise time for the CAN bus voltage 320 to be driven from its recessive (0V) state to, in the illustrated example, the threshold voltage level V3. The transmit bit duration and corresponding bus bit duration may be thus expressed as:

$$T_{bit\_}Bus=T_{bit\_}Tx-(tf-tr) \qquad \text{Equation 1}$$

Furthermore, the corresponding receive bit duration $T_{bit\_}Rx$ for the logical '1' state within the voltage signal 330 output by a CAN receiver is from time $t_2$ to time $t_5$. Notably, $t_1=t_2-trd$ where trd is the rise time for the CAN receiver voltage signal 330 from its logical '0' state to, in the illustrated example, 70%, and $t_4=t_5-tfd$ where tfd is the fall time for the CAN receiver voltage signal 330 from its logical '1' state to, in the illustrated example, 30%. The bus bit duration and corresponding receive bit duration may thus be expressed as:

$$T_{bit\_}Rx=T_{bit\_}Bus-(trd-tfd) \qquad \text{Equation 2}$$

The response time within the receiver is typically symmetrical, with the rise and fall times trd and tfd being substantially equal. As a result, the bus bit duration $T_{bit\_}Bus$ and $T_{bit\_}Rx$ may be assumed to be equal. Accordingly, Equations 1 and 2 may be re-written as:

$$T_{bit\_}Rx=T_{bit\_}Bus=T_{bit\_}Tx-(tf-tr) \qquad \text{Equation 3}$$

In practice, tr in Equation 3 represents the sum of the rising time of the CAN bus and all delays in the CAN transceiver, for example asymmetrical delays within the CAN driver 250 and within the receiver component 260. Similarly, tf in Equation 3 represents the sum of the falling time of the CAN bus and all delays in the CAN transceiver.

In order achieve symmetrical durations for bit states such that: $T_{bit\_}Tx \approx T_{bit\_}Bus \approx T_{bit\_}Rx$, any difference between tf and tr must be compensated for.

Figure 4:
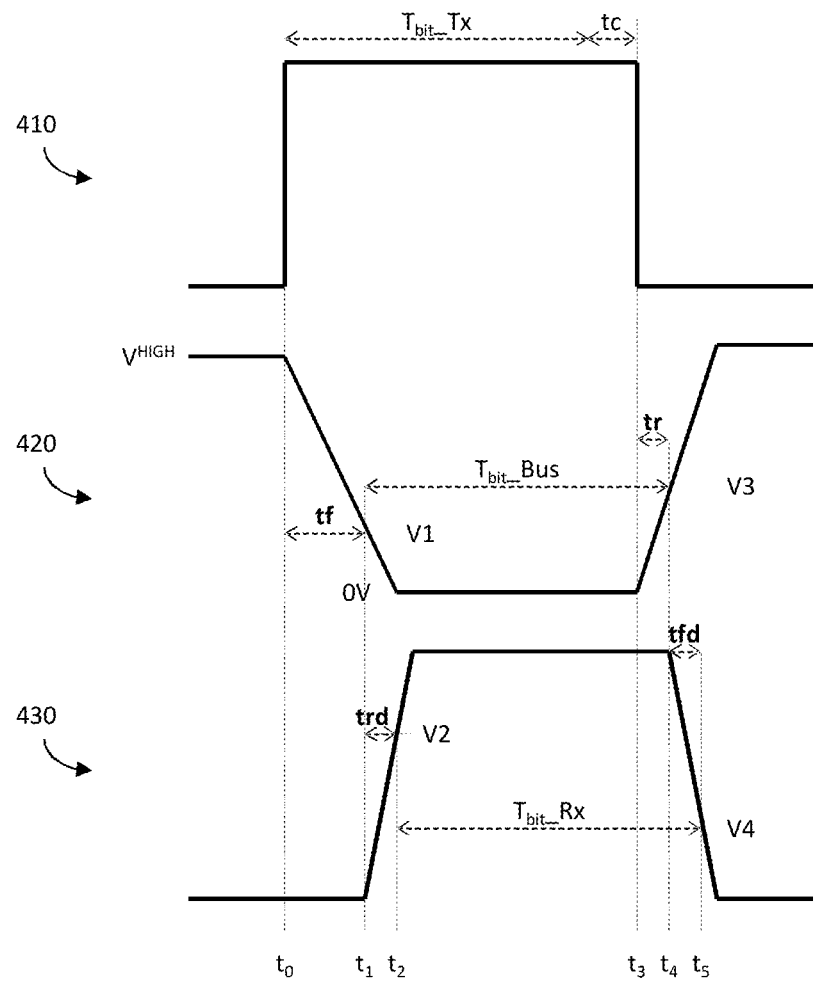

FIG. 4 schematically illustrates a transmission of bits over a CAN bus according to some example embodiments, such as may be implemented within the CAN module 200 of FIG. 2. A compensated transmit command signal provided to the CAN driver 250 is illustrated at 410. The voltage level on the CAN bus 230 is illustrated at 420. The voltage signal output by a CAN receiver in response to the voltage level 420 on the CAN bus channel is illustrated at 430. In the example illustrated in FIG. 4, the compensated transmit command signal 410 initially comprises a first ('0') logical state, in response to which the CAN driver 250 is arranged to drive a dominant ($V^{HIGH}$) state on the CAN bus 203. In response to the dominant state on the CAN bus 230, the CAN receiver is arranged to output a first ('0') logical state. At time to, the compensated transmit command signal 410 transitions to a second ('1') logical state, in response to which the CAN driver 250 is arranged to allow the CAN bus 230 to revert to its recessive (0V) state. At time $t_1$, the voltage 420 on the CAN bus 230 drops below a voltage threshold V1, triggering the CAN receiver to transition its output signal from the first ('0') logical state to a second ('1') logical state. At time $t_2$, the output signal from the CAN receiver achieves the voltage threshold level V2 required for signalling a second ('1') logical state within the CAN controller 210. At time $t_3$, the compensated transmit command signal 410 transitions back to the first ('0') logical state, in response to which the CAN driver 250 is arranged to drive the CAN bus 230 back to its dominant ($V^{HIGH}$) state. At time $t_4$, the voltage 420 on the CAN bus 230 is driven above a voltage threshold level V3, triggering the CAN receiver to transition its output signal from the second ('1') logical state to the first ('0') logical state. At time $t_5$, the output signal 430 from the CAN receiver drops to the voltage threshold level V4 required for signalling the first ('0') logical state within the CAN controller 210.

In the example illustrated in FIG. 4, the bit duration of the command signal 410 has been modified by a compensation offset tc such that the bit duration of the compensated transmit command signal 410 equals (in the illustrated example) the transmit bit duration $T_{bit\_}Tx$ plus a compensation offset tc. Accordingly, the bit durations for the example illustrated in FIG. 4 may be expressed as:

$$T_{bit\_}Rx=T_{bit\_}Bus=T_{bit\_}Tx+tc-(tf-tr) \qquad \text{Equation 5}$$

Accordingly, symmetrical durations for bit states such that: $T_{bit\_}Tx \approx T_{bit\_}Bus \approx T_{bit\_}Rx$ may be achieved by making the compensation offset tc equal to the difference between tf and tr, where tr represents the sum of the rising time of the CAN bus 230 and corresponding delays in the CAN transceiver component 220, and tf represents the sum of the falling time of the CAN bus 230 and corresponding delays in the CAN transceiver component 220. As will be appreciated, the compensation offset tc may be positive or negative, depending on the compensation required to be made to the transmit bit duration.

Referring back to FIG. 2, the CAN module 200 comprises a bit duration compensation component 240, which in the illustrated example forms a part of the CAN transceiver component 220. The bit duration compensation component 240 is arranged to receive the digital transmit command signal 212 comprising data to be transmitted over the CAN bus 230, said data comprising dominant bits having a duration $T_{bit\_}Tx$. The bit duration compensation component 240 is further arranged to receive the received data signal 214 output by the receiver component 260 and to generate a compensated transmit command signal 245 for controlling the driver component 250 to drive a dominant state on the CAN bus 230. In particular, the bit duration compensation component 240 is arranged to generate the compensated transmit command signal 245 to comprise dominant bits of a compensated-bit duration $T_{bit\_}cp=T_{bit\_}Tx+tc$, where tc comprises a compensation offset dependent on the difference between the transmit-bit duration $T_{bit\_}Tx$ of dominant bits within the digital transmit command signal 212 and the receive-bit duration $T_{bit\_}Rx$ of dominant bits within the received data signal 214. By apply such a compensation offset tc to the dominant-bit duration, asymmetrical rise and fall times on the CAN bus 230 and asymmetrical delays within the CAN transceiver component 220 may be at least partially compensated for in order to achieve greater symmetry for the duration of dominant bit states between the digital transmit command signal 212 and the received data signal 214.

Figure 5:
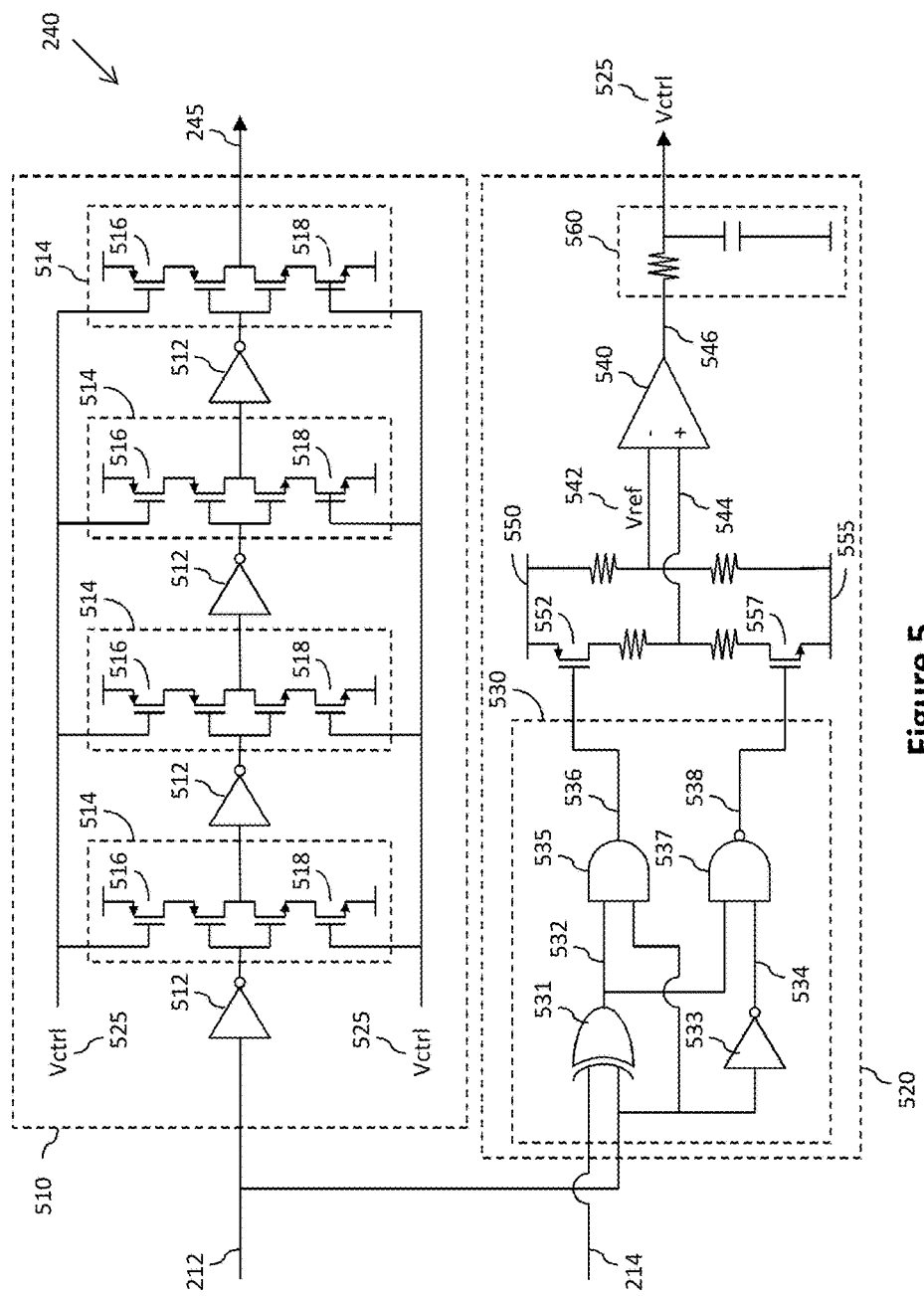
FIG. 5 schematically illustrates a simplified circuit diagram of an example of the bit duration compensation component.

FIG. 5 schematically illustrates a simplified circuit diagram of an example of the bit duration compensation component 240. In the example illustrated in FIG. 5, the bit duration compensation component 240 comprises a delay component 510 and a control component 520. The delay component 510 is arranged to receive the digital transmit command signal 212 and, in the illustrated example, to generate the compensated transmit command signal 245 by delaying rising edge transitions within the digital transmit command signal 212 by a first delay duration and delaying falling edge transitions within the digital transmit command signal 212 by a second delay duration. In particular for the illustrated example, the delay component 510 comprises a transmit command signal path consisting of a plurality of delay elements 512, 514. By delaying the rising and falling edge transitions by different delay durations, a compensation offset tc equal to the difference between the delay durations may be applied to the transmit-bit duration $T_{bit\_}Tx$ to generate the compensated-bit duration $T_{bit\_}cp=T_{bit\_}Tx+tc$.

In the illustrated example, a subset of the delay elements comprises current-starved inverters 514. Each of the current starved inverters 514 comprises a high-side current-starving transistor 516 and a low-side current-starving transistor 518. Both the high-side current starving transistors 516 and the low-side current starving transistors 518 are controlled by a delay control signal 525. In this manner, increasing the voltage level of the delay control signal 525 will increase the effective drive resistance of the current starving inverters 514 for rising edge transitions within the digital transmit command signal 212 thereby increasing the delay through the delay component 510 for rising edge transitions of the transmit command signal, whilst decreasing the effective drive resistance of the current starving inverters 514 for falling edge transitions within the digital transmit command signal 212 thereby decreasing the delay through the delay component 510 for falling edge transitions of the transmit command signal. Conversely, decreasing the voltage level of the delay control signal 525 will decrease the effective drive resistance of the current starving inverters 514 for rising edge transitions within the digital transmit command signal 212 thereby decreasing the delay through the delay component 510 for rising edge transitions of the transmit command signal, whilst increasing the effective drive resistance of the current starving inverters 514 for falling edge transitions within the digital transmit command signal 212 thereby increasing the delay through the delay component 510 for falling edge transitions of the transmit command signal.

The control component 520 is arranged to receive the digital transmit command signal 212 and the received data signal 214, and generate the delay control signal 525 based at least partly on the difference between the transmit-bit duration $T_{bit\_}Tx$ of dominant bits within the digital transmit command signal 212 and the receive-bit duration $T_{bit\_}Rx$ of dominant bits within the received data signal 214. In the example illustrated in FIG. 5, the control component 520 is arranged to generate the delay control signal 525 that to be representative of a difference between a rising edge latency (i.e. the latency between rising edge transitions of the digital transmit command signal 212 and received data signal 214) and a falling edge latency (i.e. the latency between falling edge transitions of the digital transmit command signal 212 and received data signal 214). For example, and as illustrated in FIG. 5, the control component 520 may comprise a measurement circuit 530 arranged to measure a latency between rising edge transitions of the digital transmit command signal 212 and received data signal 214 and a latency between falling edge transitions of the digital transmit command signal 212 and received data signal 214.

Figure 6:
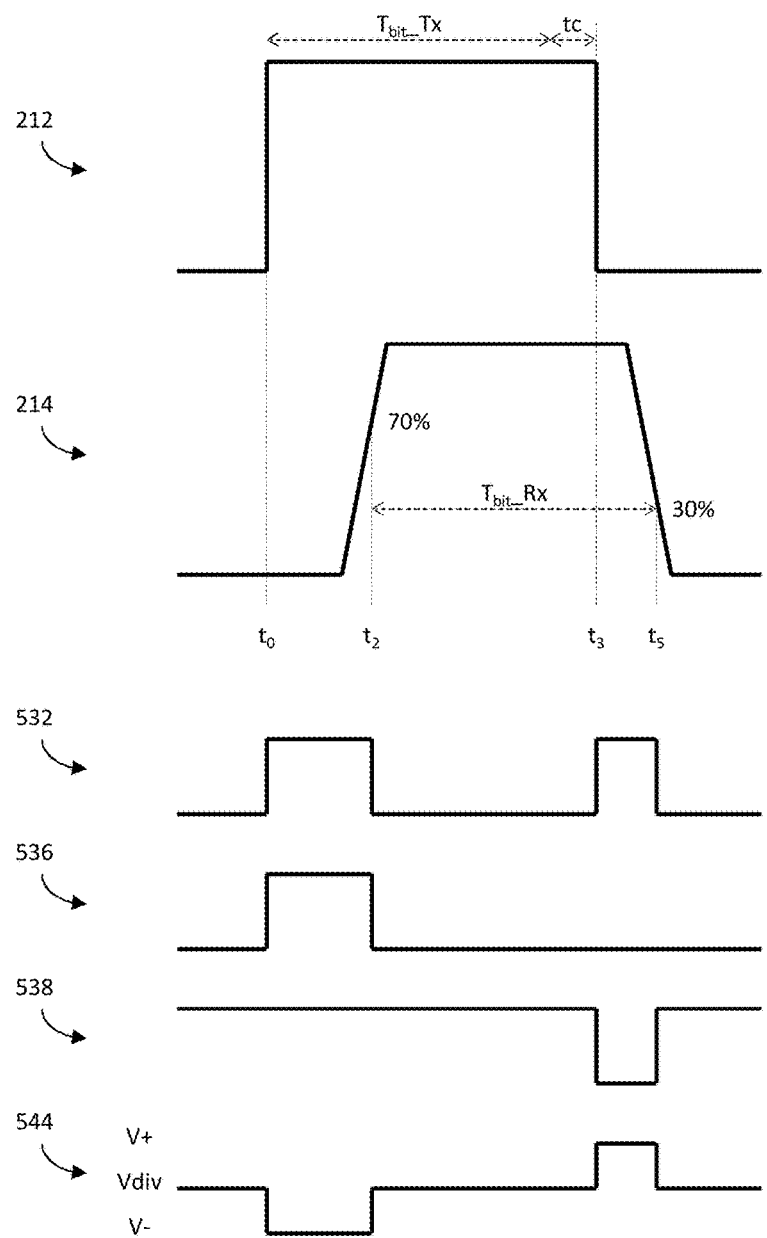
FIG. 6 illustrates a simplified timing diagram for the bit duration compensation component of FIG. 5.

In particular for the illustrated example, the measurement circuit 530 comprises an eXclusive OR gate 531 arranged to receive at inputs thereof the digital transmit command signal 212 and received data signal 214, and an inverter 533 arranged to receive the digital transmit command signal 212. The measurement circuit 530 further comprises an AND gate 535 arranged to receive at inputs thereof the output signal 532 of the eXclusive OR gate 531 and the digital transmit command signal 212 and a NAND gate 537 arranged to receive at inputs thereof the output signal 532 of the eXclusive OR gate 531 and the inverted transmit command signal 534 output by the inverter 533. Accordingly, and as illustrated in FIG. 6, the output signal 532 of the eXclusive OR gate 531 is high whenever one, but not both, of the digital transmit command signal 212 and received data signal 214 comprises a high (dominant) state. The output 536 of the AND gate 535 is high whenever both the output 532 of the eXclusive OR gate 531 and the digital transmit command signal 212 are high, and low otherwise. Accordingly, the output of the AND gate 532 is high when (and only when) the digital transmit command signal 212 is high and the receive data signal 214 is low. Thus, a high at the output 536 of the AND gate 535 is representative of the rising edge transition latency between the digital transmit command signal 212 and the receive data signal 214. Conversely, the output 538 of the NAND gate 537 is low when both the output 532 of the eXclusive OR gate 531 and the inverted transmit command signal 534 are high, i.e. when the digital transmit command signal 212 is low and the received data signal 214 is high. Thus, a low at the output 538 of the NAND gate 537 is representative of the falling edge transition latency between the digital transmit command signal 212 and the receive data signal 214.

In the example illustrated in FIG. 5, the control component 530 further comprises a comparator component 540 comprising a first input 542 arranged to receive a reference voltage signal, which in the illustrated example is provided by a first voltage divider circuit coupled between two voltage supplies 550, 555. A second input 544 of the comparator component 540 is coupled to a second voltage divider circuit. The second voltage divider circuit is coupled to the first (high) voltage supply 550 via a first (PMOS) transistor 552, and to the second (low) voltage supply 555 via a second (NMOS) transistor 557. The first transistor 552 is controlled by the output 536 of the AND gate 535, whilst the second transistor 557 is controlled by the output 538 of the NAND gate 537.

During periods of rising edge transition latency between the digital transmit command signal 212 and the receive data signal 214, when the output 536 of the to AND gate 535 is high (FIG. 6), the first transistor 552 is turned 'off'. As a result, the voltage at the second input 544 of the comparator component 540 is pulled low through the second transistor 557. Conversely, during periods of falling edge transition latency between the digital transmit command signal 212 and the receive data signal 214, when the output 538 of the NAND gate 537 is low, the second transistor 557 is turned 'off'. As a result, the voltage at the second input 544 of the comparator component 540 is pulled high through the first transistor 552. At all other times, both transistors are turned 'on', resulting in a voltage at the second input 544 of the comparator component 540 defined by the second voltage divider circuit.

Thus, the measurement circuit 530 is arranged to drive the second input 544 of the comparator component 540 to a first voltage level during periods of rising edge transition latency between the digital transmit command signal 212 and the receive data signal 214, and drive the second input 544 of the comparator component 540 to a second voltage level during periods of falling edge transition latency between the digital transmit command signal 212 and the receive data signal 214.

The control component 520 is arranged to generate the delay control signal 525 based on the output 546 of the comparator component 540. In the example illustrated in FIG. 6, the output 546 of the comparator component 540 is applied to an RC filter 560 to generate the delay control signal 525. In this manner, the RC filter 560 is arranged to average the voltage level output by the comparator component 540. Accordingly, the delay control signal 525 comprises an averaged voltage level output by the comparator component 540, which will be representative of a difference between the periods of rising edge transition latency, during which the voltage at the second input 544 of the comparator component 540 is pulled low, and the periods of falling edge transition latency, during which the voltage at the second input 544 of the comparator component 540 is pulled high.

Figure 7:
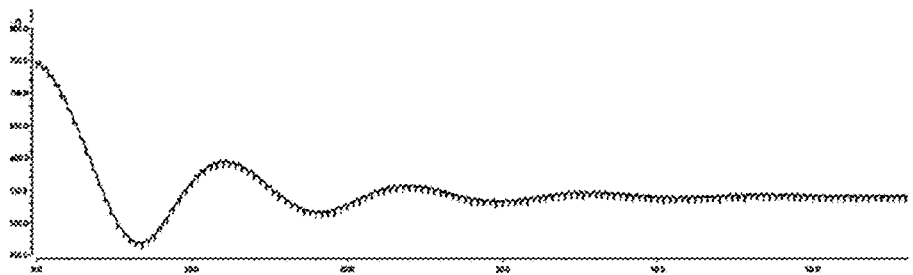
FIG. 7 illustrates a graph of voltage over time for an example of a delay control signal output by a control component illustrated in FIG. 5.

FIG. 7 illustrates a graph of voltage over time for an example of the delay control signal 525 output by the control component 520 illustrated in FIG. 5. As illustrated in FIG. 7, by feeding the received data signal 214 back into the bit duration compensation component 240, a feedback path is provided that enables the control component 520 to continually tune the delay control signal 525 until the periods of falling edge and rising edge transition latency become substantially equal, at which point the delay control signal 525 comprises a substantially steady state voltage, and significantly providing substantially symmetrical durations for bit states such that: $T_{bit\_}Tx \approx T_{bit\_}Bus \approx T_{bit\_}Rx$.

In FIG. 5, an example of the bit duration compensation component 240 is illustrated and has been described in which the delay component 510 is arranged to generate the compensated transmit command signal 245 by delaying both rising and falling transitions within the digital transmit command signal 212. However, it will be appreciated that in alternative embodiments, an alternative implementation of the delay component 510 may be arranged to generate the compensated transmit command signal 245 by delaying e of the rising and falling transitions within the digital transmit command signal 212.

Furthermore, in the illustrated examples herein before described, the compensation offset tc has been applied to dominant bits within the compensated transmit command signal. However, it is contemplated that the compensation offset tc may alternatively be applied to recessive bits within the compensated transmit command signal. It is still further contemplated that compensation offsets may alternatively be applied to both recessive bits and to dominant bits within the compensated transmit command signal.

Furthermore, it will be appreciated that the dominant state of the CAN bus driven by the CAN driver component is not limited to comprising a high voltage state, but may alternatively be implemented to comprise a low voltage state.

In FIGS. 3, 4 and 6, a logical '1' (high) state within the digital transmit command signals (212, 310, 410) and within the received data signals (214, 330. 430) have been illustrated and herein described as corresponding to a recessive, low voltage state (320, 420) on the CAN bus 230, and a logical '0' (low) state within the digital transmit command signals (212, 310, 410) and within the received data signals (214, 330. 430) have been illustrated and herein described as corresponding to a dominant, high voltage state (320, 420) on the CAN bus 230. However, it is contemplated that in alternative embodiments a logical '1' (high) state within the digital transmit command signals (212, 310, 410) and within the received data signals (214, 330. 430) may alternatively correspond to a high voltage state (320, 420) on the CAN bus 230, and a logical '0' (low) state within the digital transmit command signals (212, 310, 410) and within the received data signals (214, 330. 430) may correspond to a low voltage state (320, 420) on the CAN bus 230.

Furthermore, it is contemplated that in alternative embodiments a dominant state of the CAN bus 230 may comprise low voltage state, and a recessive state of the CAN bus 230 may comprise a high voltage state.

Figure 8:
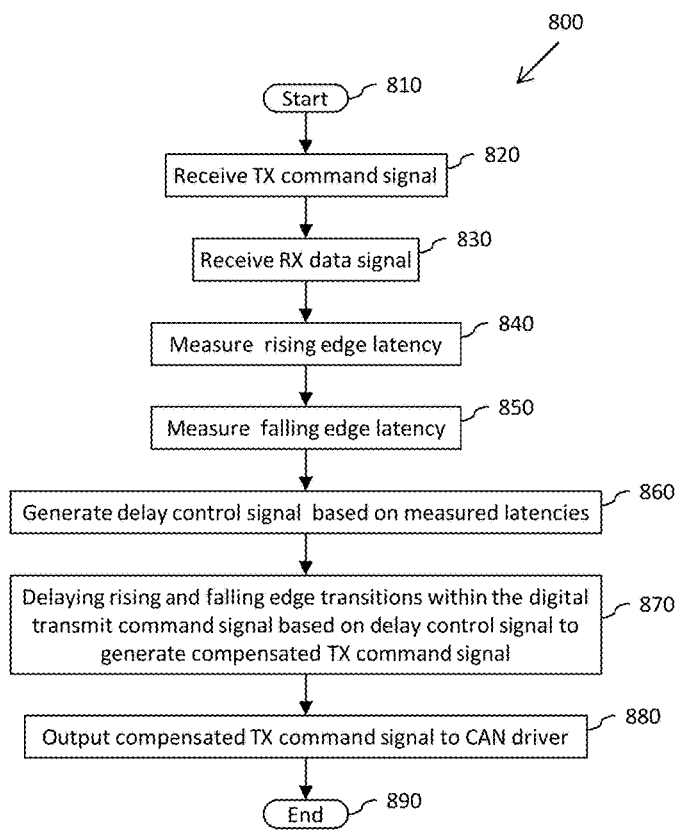
FIG. 8 illustrates a simplified flowchart of an example of a method of driving a dominant state on a CAN bus.

Referring now to FIG. 8, there is illustrated a simplified flowchart 800 of an example of a method of driving a dominant state on a CAN bus, such as may be implemented within the CAN module 200 of FIG. 2. The method starts at 810 and moves on to 820 where a digital transmit command signal is received, such as the digital transmit command signal 212 in FIGS. 2 and 5. A received data signal, such as the received data signal 214 in FIGS. 2 and 5, is received at 830. In the example illustrated in FIG. 8, rising edge and falling edge latencies between the digital transmit command signal and received data signal are measured at 840 and 850 respectively, and a delay control signal, such as the delay control signal 525 in FIG. 5, is generated based on the measured latencies at 860. Rising and falling edge transitions within the digital transmit command signal are then delayed based on the delay control signal to generate a compensated transmit command signal, at 870. The compensated transmit command signal is then output to a CAN driver component, such as the compensated transmit command signal 245 in FIGS. 2 and 5, at 880, and the method ends at 890.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 9:
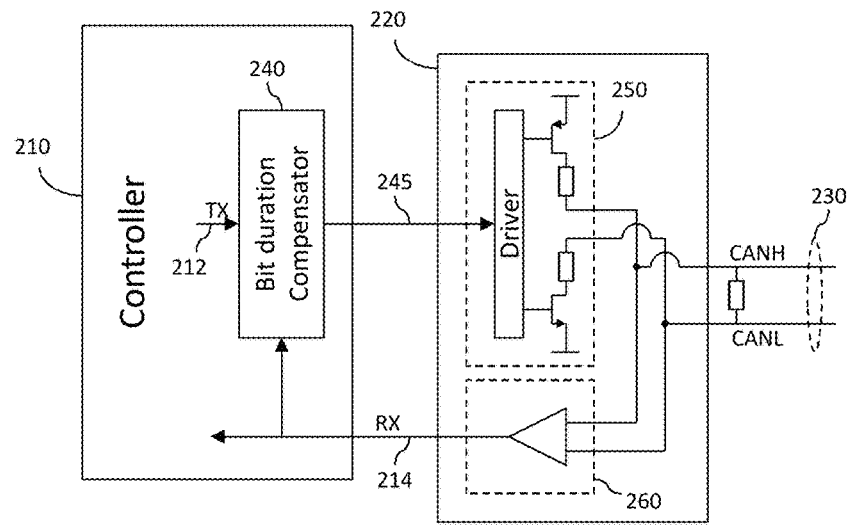
FIGS. 9 and 10 illustrate further simplified block diagrams of a part of a CAN module with at least part of a bit duration compensation component integrated within a CAN controller.
Figure 10:
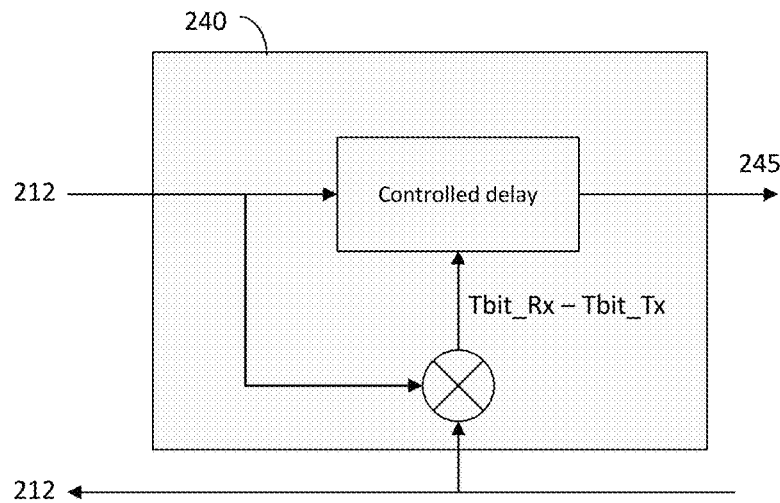

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated examples, the bit duration compensation component 240 has been illustrated as being implemented within the CAN transceiver component 220. However, it will be appreciated that the bit duration compensation component 240 may alternatively be implemented, at least in part, separate from the CAN transceiver component 220. For example, and as illustrated in FIGS. 9 and 10, at least part of the bit duration compensation component 240 may be integrated within the CAN controller 210, for example by way of digital circuitry. Additionally/alternatively at least part of the bit duration compensation component 240 may be implemented as a standalone component between the CAN controller 210 and CAN transceiver component 220. In some still further embodiments, it is contemplated that at least part of the bit duration compensation component 240 may be implemented by way of computer program code executing on one or more processing devices.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A controller area network, CAN, module comprising a driver component controllable to drive a dominant state on a CAN bus and a receiver component arranged to generate a received data signal corresponding to a voltage signal on the CAN bus;
wherein the CAN module further comprises a bit duration compensation component arranged to:
receive a digital transmit command signal comprising dominant bits having a duration $T_{bit\_}Tx$;
receive the received data signal;
generate a compensated transmit command signal for controlling the driver component to drive a dominant state on the CAN bus, the compensated transmit command signal comprising dominant bits of a compensated-bit duration $T_{bit\_}cp=T_{bit\_}Tx+tc$, wherein tc comprises a compensation offset derived at least partly from a difference between a transmit-bit duration of the digital transmit command and a receive-bit duration of the received data signal.

2. The CAN module of claim 1, wherein the bit duration compensation component comprises a delay component arranged to receive the digital transmit command signal and output the compensated transmit command signal, wherein the delay component is arranged to generate the compensated transmit command signal by delaying at least one of rising edge transitions and falling edge transitions within the digital transmit command signal.

3. The CAN module of claim 2, wherein the delay component is arranged to generate the compensated transmit command signal by delaying rising edge transitions within the digital transmit command signal by a first delay duration and delaying falling edge transitions within the digital transmit command signal by a second delay duration.

4. The CAN module of claim 2, wherein the delay component is arranged to receive a delay control signal, and to delay at least one of the rising and falling edge transitions within the digital transmit command signal based at least partly on the received delay control signal.

5. The CAN module of claim 4, wherein the delay component comprises at least one current-starved inverter, the at least one current-starved inverter comprising a high-side current-starving transistor and a low-side current-starving transistor, the high-side and low-side current starving transistors being controlled by the delay control signal.

6. The CAN module of claim 2, wherein the bit duration compensation component further comprises a control component arranged to:
receive the digital transmit command signal;
receive the received data signal; and
generate the delay control signal based at least partly on the difference between the transmit-bit duration of the digital transmit command and the receive-bit duration of the received data signal.

7. The CAN module of claim 6, wherein the control component comprises a measurement circuit arranged to measure a rising edge transition latency between rising edge transitions of the digital transmit command signal and the received data signal and a falling edge transition latency between falling edge transitions of the digital transmit command signal and received data signal, and the control component is arranged to generate the delay control signal based at least partly on the measured rising edge transition latency and falling edge transition latency.

8. The CAN module of claim 7, wherein the control component further comprises a comparator component comprising a first input arranged to receive a reference voltage signal, and the measurement circuit is arranged to:
drive a second input of the comparator component to a first voltage level during periods of rising edge transition latency between the digital transmit command signal and the receive data signal, and
drive the second input of the comparator component to a second voltage level during periods of falling edge transition latency between the digital transmit command signal and the receive data signal; and
the control component is arranged to generate the delay control signal based at least partly on the output of the comparator component.

9. The CAN module of claim 8, wherein the output of the comparator component is applied to an RC filter to generate the delay control signal.

10. The method of claim 9, wherein the method further comprises:
measuring a rising edge latency between the digital transmit command signal and the received data signal;
measuring a falling edge latency between the digital transmit command signal and the received data signal; and
delaying rising and falling edge transitions within the compensated transmit command signal based at least partly on the measured rising edge transition latency and falling edge transition latency.

11. The CAN module of claim 1, wherein the bit duration compensation component is arranged to derive the compensation offset tc from at least one of:
a difference between a dominant transmit-bit duration of the digital transmit command signal and a dominant receive-bit duration of the received data signal; and
a difference between a recessive transmit-bit duration of the digital transmit command signal and a recessive receive-bit duration of the received data signal.

12. The CAN module of claim 1, wherein the bit duration compensation component is implemented within a CAN transceiver component of the CAN module.

13. The CAN module of claim 1, wherein the bit duration compensation component is implemented within a CAN controller of the CAN module.

14. A method of driving a dominant state on a controller area network, CAN, bus, the method comprising:
receiving a digital transmit command signal comprising dominant bits having a duration $T_{bit\_}Tx$;
receiving a received data signal;
generating a compensated transmit command signal comprising dominant bits of a compensated-bit duration $T_{bit\_}cp=T_{bit\_}Tx+tc$, wherein tc comprises a compensation offset derived at least partly from a difference between a transmit-bit duration of the transmit command signal and a receive-bit duration $T_{bit\_}Rx$ of the received data signal; and
output the compensated transmit command signal to a CAN driver component.

* * * * *